US009075647B2

(12) United States Patent
Angaluri et al.

(10) Patent No.: US 9,075,647 B2
(45) Date of Patent: Jul. 7, 2015

(54) PREEMPTIVE GUEST MERGING FOR VIRTUALIZATION HYPERVISORS

(75) Inventors: Srihari V. Angaluri, Raleigh, NC (US); Matthew R. Archibald, Kingsville (AU); William E. Bauman, Philadelphia, PA (US); Jerrod K. Buterbaugh, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 13/195,440

(22) Filed: Aug. 1, 2011

(65) Prior Publication Data

US 2013/0036249 A1 Feb. 7, 2013

(51) Int. Cl.
*G06F 12/02* (2006.01)
*G06F 9/455* (2006.01)
*G06F 12/10* (2006.01)

(52) U.S. Cl.
CPC ............ *G06F 9/45558* (2013.01); *G06F 12/10* (2013.01); *G06F 2009/45583* (2013.01)

(58) Field of Classification Search
CPC . G06F 9/30004; G06F 9/3834; G06F 9/3004; G06F 9/45558; G06F 12/10
USPC ..................... 711/155, 161, 6, 202
See application file for complete search history.

(56) References Cited

U.S. PATENT DOCUMENTS 6,789,156 B1 * 9/2004 Waldspurger .................... 711/6
7,500,048 B1 3/2009 Venkitachalam et al.
7,620,766 B1 * 11/2009 Waldspurger .................... 711/6
2008/0028124 A1 1/2008 Tago
2009/0300263 A1 12/2009 Devine et al.
2010/0088474 A1 4/2010 Agesen
2010/0153617 A1 6/2010 Miroshnichenko et al.
2010/0223432 A1 9/2010 Eidus et al.
2012/0017027 A1 * 1/2012 Baskakov et al. ................. 711/6

OTHER PUBLICATIONS

Kloster et al., "A Paravirtualized Approach to Content-Based Page Sharing," Jun. 2007, pp. 1-20, a Paper from Department of Computer Science, Aalborg University, Denmark.
Waldspurger, "Memory Resource Management in VMware ESX Server," Dec. 2002, 15 pages, Proceedings of the 5th Symposium on Operating Systems Design and Implementation, USENIX Association.
Osman et al., "The Design and Implementation of Zap: A System for Migrating Computing Environments," Dec. 2002, 27 pages, Proceedings of the 5th Symposium on Operating Systems Design and Implementation.

* cited by examiner

*Primary Examiner* — Than Nguyen
(74) *Attorney, Agent, or Firm* — Andrea Barbuto; Hoffman Warnick LLC

(57) ABSTRACT

Aspects of the present invention provide a solution for managing memory in a shared virtual computing environment. A page that is to be stored in the memory of the host in the virtual computing environment is obtained from a guest. The page is analyzed to compute an identifier for the page. This identifier is compared with other identifiers of other pages that are currently stored in the memory to determine whether the identical page is already stored in the memory. If the identical page is currently stored in the memory, a link to that page is stored in the portion of the memory that is allocated to the guest.

20 Claims, 4 Drawing Sheets

PREEMPTIVE GUEST MERGING FOR VIRTUALIZATION HYPERVISORS

FIELD OF THE INVENTION

The subject matter of this invention relates generally to computer data access. More specifically, aspects of the present invention provide a system and method for merging accessed data, such as in a virtual computing environment.

BACKGROUND OF THE INVENTION

In the information technology environment of today, much use is made of virtual computing. Virtual computing, in this application, includes the use of software systems that simulate the actions of hardware system. The use of virtual computing provides flexibility in the computing environment, by, among other things, allowing application designers to ignore, to some extent, the limitations and/or constraints that a particular native hardware system might otherwise impose on the application.

One form of virtual computing that has seen increased popularity is the virtualization hypervisor. A virtualization hypervisor uses virtual computing to allow multiple operating systems, called guests, to run on a single host computer. This allows a plurality of different operating systems and/or applications to be run concurrently by a plurality of different guests on the same piece of hardware. Each guest instance can be housed in a different virtual machine, providing isolation and encapsulation from other guest instances and giving each guest the illusion that it is utilizing the actual system hardware.

One challenge in the virtual computing environment, particularly in the area of virtualization hypervisors, comes in maximizing the limited hardware resources of the host computer system. For example, memory must be allocated to each guest in order for the guests to perform the functions that they need to perform. These functions may include such tasks as executing a particular application on a particular operating system using particular data, for example, each of which would need to be stored in the memory of the host. However, as more guests utilize more of the host system's memory, this resource can become scarce, requiring rationing of guests and/or memory usage per guest or requiring use of slower types of data storage.

SUMMARY OF THE INVENTION

In general, aspects of the present invention provide a solution for managing memory in a shared virtual computing environment. A page that is to be stored in the memory of the host in the virtual computing environment is obtained from a guest. The page is analyzed to compute an identifier for the page. This identifier is compared with other identifiers of other pages that are currently stored in the memory to determine whether the identical page is already stored in the memory. If the identical page is currently stored in the memory, a link to that page is stored in the portion of the memory that is allocated to the guest.

A first aspect of the invention provides a method for managing memory in a shared virtual computing environment, comprising: obtaining a page from a guest to be stored in the memory of a host in the shared virtual computing environment; analyzing the page to compute an identifier for the page; comparing the identifier with other identifiers of other pages currently stored in the memory to find an identical page; and storing, in the case that an identical page is found, a link to the identical page in a portion of the memory allocated to the guest.

A second aspect of the invention provides a system for managing memory in a shared virtual computing environment, comprising a computer system having at least one computer device that performs a method, comprising: sensing electricity usage for a single device, the device being independently coupled to an electricity distribution network; identifying an electricity usage pattern for the device, based on the electricity usage of the device; determining, based on the electricity usage pattern, a classification of the device; and controlling a supply of electricity to the device based on the classification.

A third aspect of the invention provides a computer program product embodied in a computer readable storage medium for managing memory in a shared virtual computing environment, the method comprising: obtaining a page from a guest to be stored in the memory of a host in the shared virtual computing environment; analyzing the page to compute an identifier for the page; comparing the identifier with other identifiers of other pages currently stored in the memory to find an identical page; and storing, in the case that an identical page is found, a link to the identical page in a portion of the memory allocated to the guest.

A fourth aspect of the present invention provides a method for deploying an application for managing memory in a shared virtual computing environment, comprising, providing a computer system operable to: obtain a page from a guest to be stored in the memory of a host in the shared virtual computing environment; analyze the page to compute an identifier for the page; compare the identifier with other identifiers of other pages currently stored in the memory to find an identical page; and store, in the case that an identical page is found, a link to the identical page in a portion of the memory allocated to the guest.

Still yet, any of the components of the present invention could be deployed, managed, serviced, etc., by a service provider who offers to control electricity to a device.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
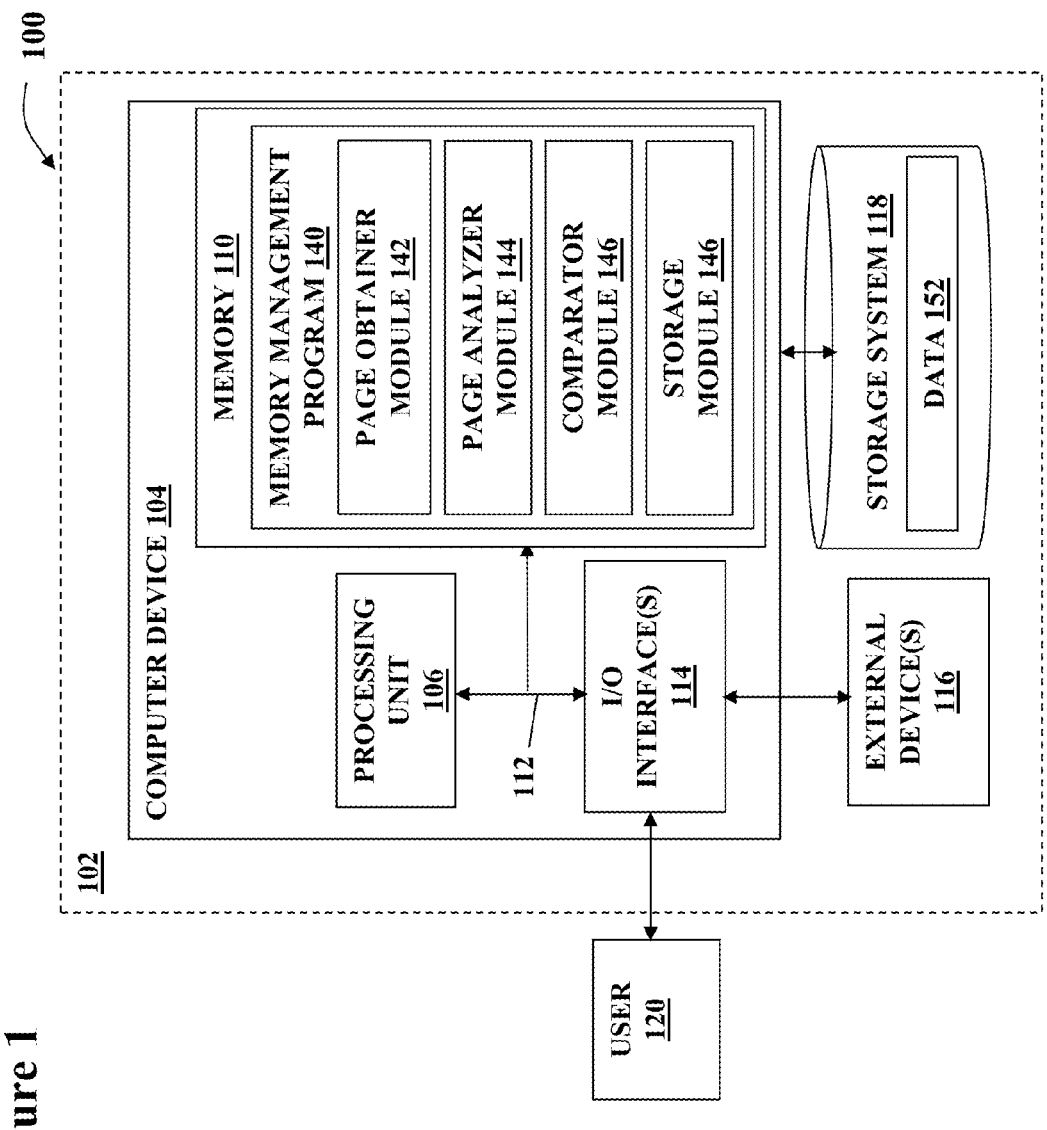
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, aspects of the present invention provide a solution for managing memory in a shared virtual computing environment. A page that is to be stored in the memory of the host in the virtual computing environment is obtained from a guest. The page is analyzed to compute an identifier for the page. This identifier is compared with other identifiers of other pages that are currently stored in the memory to determine whether the identical page is already stored in the memory. If the identical page is currently stored in the memory, a link to that page is stored in the portion of the memory that is allocated to the guest.

Turing to the drawings, FIG. 1 shows an illustrative environment 100 for managing memory in a shared virtual computing environment. To this extent, environment 100 includes a computer system 102 that can perform a process described herein in order to manage memory in a shared virtual computing environment. In particular, computer system 102 is shown including a computing device 104 that includes a memory management program 140, which makes computing device 104 operable to manage memory in a shared virtual computing environment by performing a process described herein.

Computing device 104 is shown including a processing unit 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing unit 116 executes program code, such as memory management program 140, which is at least partially fixed in memory 110. Memory 110 can also include local memory employed during actual execution of the program code, bulk storage (storage 118), and cache memories (not shown) which provide temporary storage of at least some program code in order to reduce the number of times code must be retrieved from bulk storage 118 during execution. While executing program code, processing unit 106 can process data, which can result in reading and/or writing transformed data from/to memory 110 and/or I/O component 114 for further processing. Pathway 112 provides a direct or indirect communications link between each of the components in computer system 102. I/O interface component 114 can comprise one or more human I/O devices, which enable a human user 120 to interact with computer system 102 and/or one or more communications devices to enable a system user 120 to communicate with computer system 102 using any type of communications link.

To this extent, memory management program 140 can manage a set of interfaces (e.g., graphical user interface(s), application program interface, and/or the like) that enable human and/or system users 120 to interact with memory management program 140. Further, memory management program 140 can manage (e.g., store, retrieve, create, manipulate, organize, present, etc.) data 152 using any solution.

In any event, computer system 102 can comprise one or more general purpose computing articles of manufacture 104 (e.g., computing devices) capable of executing program code, such as memory management program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, memory management program 140 can be embodied as any combination of system software and/or application software. In any event, the technical effect of computer system 102 is to provide processing instructions to computing device 104 in order to manage memory in a shared virtual computing environment.

Further, memory management program 140 can be implemented using a set of modules 142-148. In this case, a module 142-148 can enable computer system 102 to perform a set of tasks used by memory management program 140, and can be separately developed and/or implemented apart from other portions of memory management program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing unit 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of memory management program 140 fixed thereon (e.g., one or more modules 142-148). However, it is understood that computer system 102 and memory management program 140 are only representative of various possible equivalent computer systems that may perform a process described herein. To this extent, in other embodiments, the functionality provided by computer system 102 and memory management program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, memory management program 140 enables computer system 102 to manage memory in a shared virtual computing environment. To this extent, memory management program 140 is shown including a page obtainer module 142, a page analyzer module 144, a comparator module 146, and a storage module 148.

Figure 2:
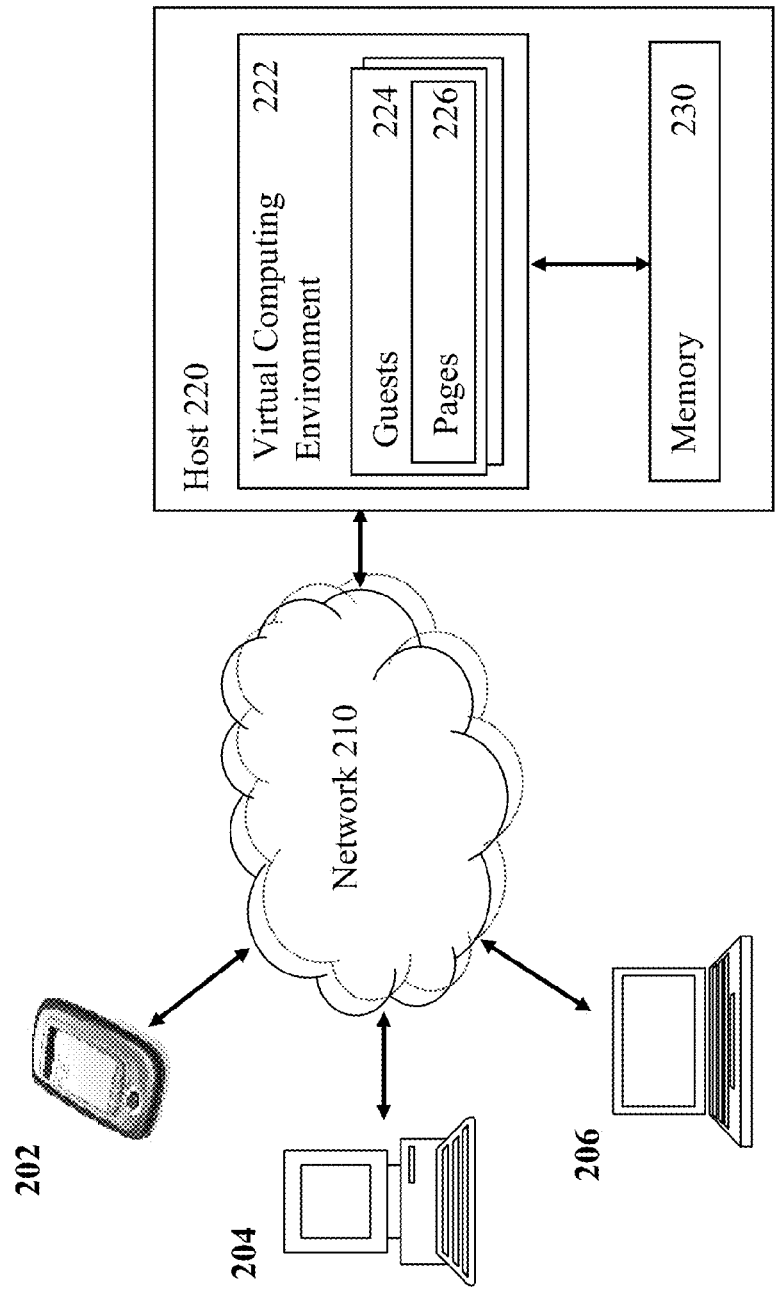
FIG. 2 shows a network having a shared virtual computing environment according to an embodiment of the present invention.

Referring now to FIG. 2, a shared virtual computing environment 200 according to an embodiment of the invention is shown. Shared virtual computing environment 200 includes a number of user devices 202-206 which communicate with a host 220 over a network 220. As shown, user devices 202-206 that include a mobile device 202, a workstation 204 and a laptop computer 206. It should be recognized, however, that any device that is now known or later developed for accessing a host 220 over a network 210 can be used. Similarly, network 210, could include any combination of various types of wired and/or wireless links; could comprise any combination of one or more types of networks; and/or could utilize any combination of various types of transmission techniques and protocols that are now know or later developed.

In any case, host 220 can include any machine or set of machines now known or later developed for implementing a virtual computing environment 222 in shared virtual computing environment 200. To this extent, host 220 can include one or more computing devices 104 (FIG. 1). Virtual computing environment 222 allows host 220 to run multiple operating systems concurrently with one another on the same piece of hardware and to do so with respect to multiple users 202-206 concurrently and in isolation from one another. To this extent, virtual computing environment can include a virtualization hypervisor, such as Virtual Box (Virtual Box is a trademark of Sun Microsystems of Santa Clara, Calif., in the United States, other countries, or both) or VMware Workstation (VMware is a trademark of VMware of Palo Alto, Calif., in the United States, other countries, or both). More popular enterprise hypervisors include applications such as VMware ESX (ESX is a trademark of VMware of Palo Alto, Calif. in the United States, other countries, or both), Red Hat KVM (Red Hat is a trademark of Red Hat, Inc., of Raleigh, N.C., in the United States, other countries, or both), Citrix Xen Server (Citrix is a trademark of Citrix of Fort Lauderdale, Fla., in the United States, other countries, or both), and Microsoft HyperV (Microsoft is a trademark of Microsoft Corporation of Redmond, Wash., in the United States, other countries, or both). Virtual computing environment 222 can exist in one of several configurations, including, but not limited to as a virtual layer between the hardware layer and the operating system and/or an application that runs on top of the base operating system of the computer system, although other embodiments can be envisioned.

In any event, as shown, for each user 202-206 who accesses host 220, one or more virtual machine instances (guests 224) are created, with each guest 224 being associated with a particular instance of an operating system with its associated applications and/or data that are able to perform the tasks required by the particular user 202-206. Each of these operating systems, applications and/or data is run from memory 230. These are written into memory 230 in small (e.g., 1 kb), often discrete sized blocks called pages 226. As such, a large number of pages 226 can be allocated in memory 230 to one particular operating system, application, or set of data. Virtual computing environment 222 will access the particular pages 226 from the portion of memory 230 allocated to a particular guest 224 associated with a particular user 202-206 to perform the operations required to complete the needed tasks.

Referring now to FIG. 1 in conjunction with FIG. 2 computer system 102 (e.g., page obtainer module 142) obtains a page 226 from a guest 224 to be stored in a memory 230 of a host 220 in the shared virtual computing environment 220. This page 226 can include all or any fragment of an operating system, application, dataset, etc., that guest 224 is using within the confines of virtual computing environment 222. It is important to note that the page 226 that is obtained by page obtainer module 142 is not currently stored in memory 230, but rather is designated for storage in memory 230, so that, for example, operations can be performed using the operating system, application or dataset that includes the particular page 226.

Once page 226 has been obtained, computer system 102 (e.g., page analyzer module 144) analyzes page 226 to compute an identifier for the page 226. This identifier is based on the characteristics of page 226, such as the data included in page 226. To this extent, when page analyzer module 144 uses the same computation with respect to pages 226 having identical information, each of the computations would yield identical identifiers. To this extent, any solution now known or later developed for computing an identifier of this sort now known or later developed is envisioned. In one embodiment, page 226 is hashed using a hash key, and the result becomes the identifier. In any case, analyzer module 144 performs its analysis of page 226 that has not been stored in memory 230.

Computer system 102 (e.g., comparator module 144) can then compare the identifier with other identifiers of other pages 226 currently stored in memory 230 to find an identical page. For example, in the hashing algorithm example above, identifiers associated with any other pages 226 currently stored in memory 230 could be stored in a hash table. These other pages 226 would have been hashed previously, such as at the time that these other pages 226 were stored in memory and their identifiers stored in the hash table. This hash table could be searched against the identifier computed from the obtained page 226. If an identifier was found in the hash table that matched the identifier computed from the obtained page 226, it could be concluded that a page 226 that was identical to the obtained page 226 was already stored in memory, such as in a portion of memory allocated to another guest 224.

This is in contrast to solutions in which the memory is scanned to identify pages that are identical and perform a page merge to reduce the utilized memory foot print at the point in time that the physical memory becomes full or substantially full. The page scan, hash, and merge in these solutions happen while data is still being accessed in memory. Because these page merging technologies and methods rely on scanning after data already exists in memory and data is simultaneously being accessed, there exists a performance trade-off of being able to access data and merge existing pages in memory. As each page is scanned, the bit-wise contents are run through an algorithm to develop a hash value based on the contents. These hash values are iteratively compared against all other hash values to identify pages for merging.

Figure 3A:
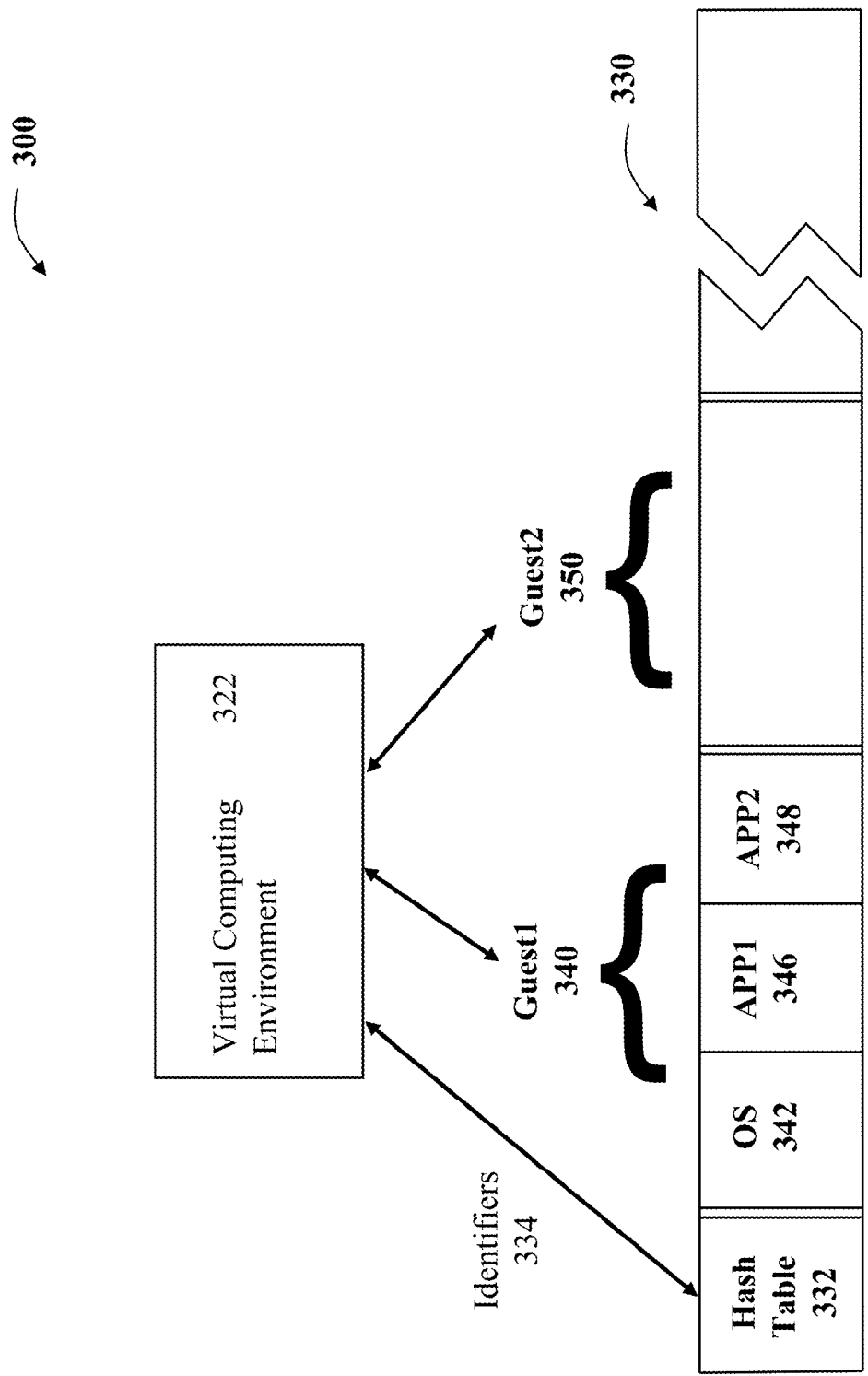
FIG. 3a shows an exemplary allocation of memory according to an embodiment of the invention.

Turning now to FIG. 3a, an illustration 300 of an allocation of memory 330 according to an embodiment of the current invention is shown. As illustrated, two guests 340 and 350 are currently utilizing memory 330 in conjunction with virtual computing environment 322. As shown, guest1 340 currently has three pages 342-348 stored in memory 330, namely, OS 342, which represents a page associated with an operating system, App1 346, which represents a page associated with an application, and App2 348, which represents another page associated with an application. It should be recognized that the size of the blocks indicated in the figure may not necessarily reflect the relative size of elements stored therein. Further, the number of pages 342-348 stored in memory 330 should not be taken as limiting. Still further, it should be recognized that elements, such as App1 and App2, in this figure and others could be associated with the same item, in this case application, or distinct items. In any case, each of the pages 342-348 stored in memory 330 is distinct with no duplicate pages stored in memory 330. Further, an identifier 334 for each of the currently saved pages 342-348 is stored in hash table 332.

Referring again to FIGS. 1 and 2 in combination, computer system 102 (e.g., storage module 148) stores information in memory 230 that allows guest 224 to retrieve page 226. Specifically, in the case that an identical page 226 is found by comparator module 146, i.e., an identical identifier is found, a link to the identical page 226 is stored in the portion of memory 330 allocated to the guest. Conversely, in the case that the identical page 226 is not found by comparator module 146, i.e., an identical identifier is not found, the page 226 itself is stored in the portion of memory 330 allocated to the guest and an identifier associated with page 226 would be stored, along with the location of page 226 in memory 230.

Figure 3B:
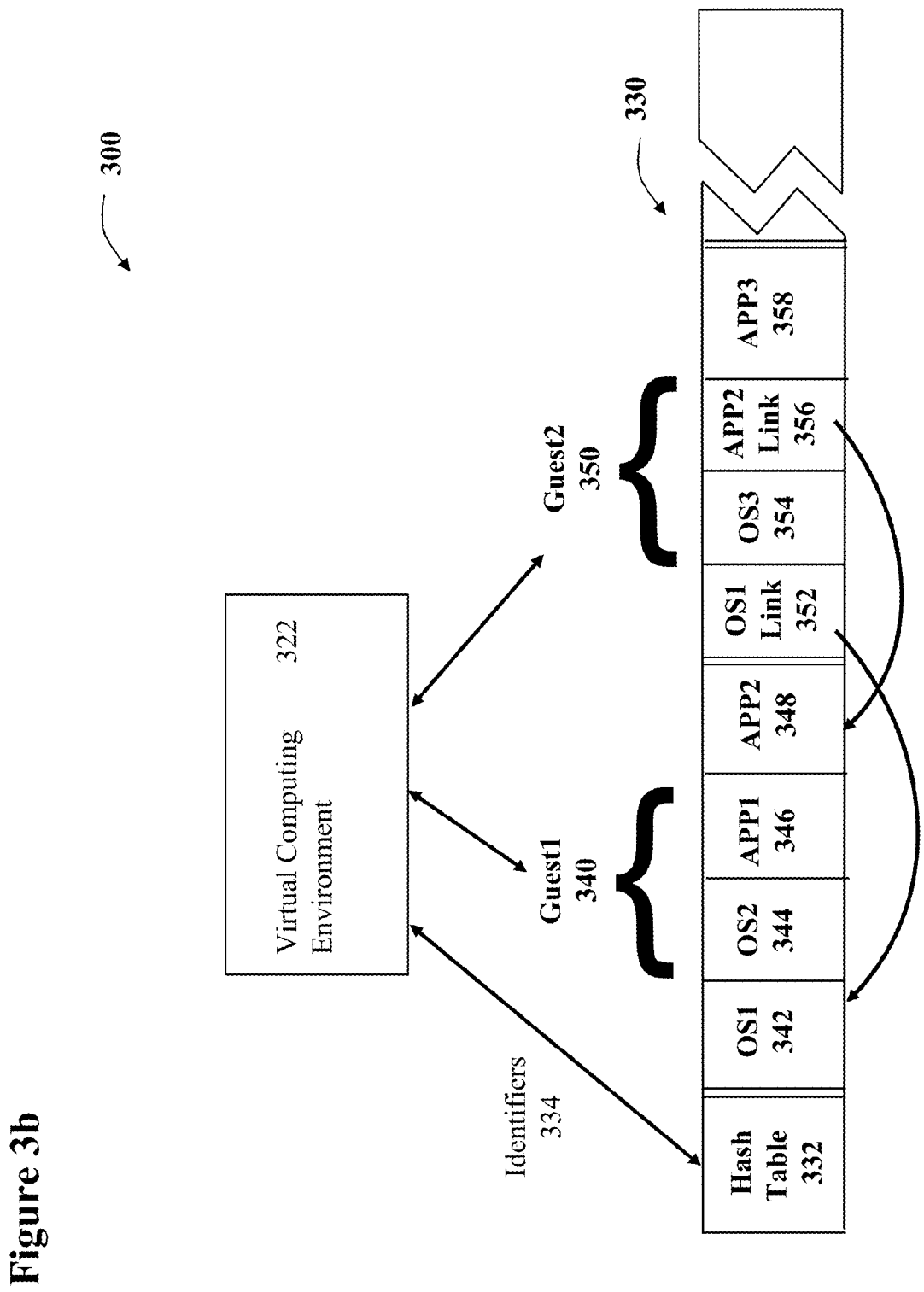
FIG. 3b shows an exemplary allocation of memory according to an embodiment of the invention.

FIG. 3b shows allocation 300 of memory at a second point in time that is subsequent to that of FIG. 3a. As illustrated, guest1 340 has stored OS2 344, which is another operating system related page. Subsequently, guest2 350 has attempted to store pages in memory 330. Notice that guest2 350 has stored two new unique pages, OS3 354 and App3 358. Also notice that guest2 needs to utilize pages OS1 342 and App2 348, which have already been stored by guest1 340. As the identifiers 334 calculated for these two pages would match identifiers 334 currently stored in hash table 332, duplicates of the pages 342, 348 are not stored in memory 330. Rather, links 352, 356 to the pages 342, 348 are stored in the portion of memory 330 that is allocated to guest2 350.

Referring back to FIG. 2, in this way, duplication of pages 226 in memory 230 is minimized or eliminated altogether. This frees up memory 230, allowing more guests 224 to utilize memory 230 and/or to utilize more of memory 230 per guest 224. Further, as pages 226 of other guests are not accessed directly, isolation and encapsulation are maintained amount guests 224. Still further, as the evaluation is performed at run time based on previously prepared hashing and indexing, the comparison and merging can all done before a write to memory is made) 230, which reduces or eliminates costly processes in which the entire memory 230 is searched and compressed are avoided.

While shown and described herein as a method and system for configuring software for an electric meter, it is understood that aspects of the invention further provide various alternative embodiments. For example, in one embodiment, the invention provides a computer program fixed in at least one computer-readable medium, which when executed, enables a computer system to configuring software for an electric meter. To this extent, the computer-readable medium includes program code, such as memory management program 140 (FIG. 2), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as memory management program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for configuring software for an electric meter. In this case, a computer system, such as computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A method for managing memory in a shared virtual computing environment, comprising:
    prior to any storage of a page from a guest in the memory:
        analyzing the page to compute an identifier for the page; and
        comparing the identifier with other identifiers of other pages currently stored in the memory to find an identical page, wherein a match between the identifier and the identifier of one of the other pages currently stored in memory indicates that the page corresponding to the identifier and the other page corresponding to the matching identifier and identical; and
    storing, in the case that an identical page is found, a link to the identical page in a portion of the memory allocated to the guest.

2. The method of claim 1, wherein the analyzing further comprises hashing data contained in the page, wherein the identifier is a numerical result of the hashing.

3. The method of claim 2, wherein the comparing further comprises searching a hash table having identifiers associated with all of the other pages stored in the memory to determine whether there is a matching identifier.

4. The method of claim 1, further comprising storing, in case that the identical page is not found, the page in the portion of the memory allocated to the guest and storing the identifier.

5. The method of claim 1, wherein the shared virtual computing environment includes a virtualization hypervisor.

6. The method of claim 1, wherein the page includes at least a portion of at least one of an operating system or an application.

7. The method of claim 1, wherein the identical page is currently stored in a second portion of the memory allocated to a second guest.

8. A computer program product embodied in a non-transitory computer readable storage medium for managing memory in a shared virtual computing environment, the method comprising:
> prior to any storage of a page from a guest in the memory;
>> analyzing the page to compute an identifier for the page; and
>> comparing the identifier with other identifiers of other pages currently stored in the memory to find an identical page, wherein a match between the identifier and the identifier of one of the other pages currently stored in memory indicates that the page corresponding to the identifier and the other page corresponding to the matching identifier are identical; and
>
> storing, in the case that an identical page is found, a link to the identical page in a portion of the memory allocated to the guest.

9. The computer program product of claim 8, wherein the analyzing further comprises hashing data contained in the page, wherein the identifier is a numerical result of the hashing.

10. The computer program product of claim 9, wherein the comparing further comprises searching a hash table having identifiers associated with all of the other pages stored in the memory to determine whether there is a matching identifier.

11. The computer program product of claim 8, further comprising storing, in case that the identical page is not found, the page in the portion of the memory allocated to the guest and storing the identifier.

12. The computer program product of claim 8, wherein the shared virtual computing environment includes a virtualization hypervisor.

13. The computer program product of claim 8, wherein the page includes at least a portion of at least one of an operating system or an application.

14. A system for managing memory in a shared virtual computing environment, comprising a computer system having at least one computer device that performs a method, comprising:
> prior to any storage of a page from a guest in the memory:
>> analyzing the page to compute an identifier for the page; and
>> comparing the identifier with other identifiers of other pages currently stored in the memory to find an identical page, wherein a match between the identifier and the identifier of one of the other pages currently stored in memory indicates that the page corresponding to the identifier and the other page corresponding to the matching identifier and identical; and
>
> storing, in the case that an identical page is found, a link to the identical page in a portion of the memory allocated to the guest.

15. The system of claim 14, wherein the analyzing further comprises hashing data contained in the page, wherein the identifier is a numerical result of the hashing.

16. The system of claim 15, wherein the comparing further comprises searching a hash table having identifiers associated with all of the other pages stored in the memory to determine whether there is a matching identifier.

17. The method of claim 14, further comprising storing, in case that the identical page is not found, the page in the portion of the memory allocated to the guest and storing the identifier.

18. The system of claim 14, wherein the shared virtual computing environment includes a virtualization hypervisor.

19. The system of claim 14, wherein the page includes at least a portion of at least one of an operating system or an application.

20. The system of claim 14, wherein the identical page is currently stored in a second portion of the memory allocated to a second guest.

\* \* \* \* \*